(12) United States Patent
Svensson et al.

(10) Patent No.: US 8,528,023 B2
(45) Date of Patent: Sep. 3, 2013

(54) EXTENDED TELEVISION REMINDERS

(75) Inventors: Magnus Svensson, Stockholm (SE); Mathias Bogebrant, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 13/058,482

(22) PCT Filed: Aug. 14, 2008

(86) PCT No.: PCT/IB2008/002950
§ 371 (c)(1),
(2), (4) Date: Feb. 10, 2011

(87) PCT Pub. No.: WO2010/018421
PCT Pub. Date: Feb. 18, 2010

(65) Prior Publication Data
US 2011/0154408 A1    Jun. 23, 2011

(51) Int. Cl.
*G06F 3/00* (2006.01)
*G06F 13/00* (2006.01)

(52) U.S. Cl.
USPC ............................. 725/58; 725/40; 725/52

(58) Field of Classification Search
USPC .............................................. 725/58, 40, 52
See application file for complete search history.

(56) References Cited

U.S. PATENT DOCUMENTS 8,065,362 B2 * 11/2011 Greven et al. ................. 709/203
2008/0115160 A1    5/2008 Palo et al.
2008/0115169 A1 *  5/2008 Ellis et al. ........................ 725/46
2008/0172706 A1 *  7/2008 Robinson et al. ............. 725/109
2008/0244670 A1  10/2008 Huang
2011/0138432 A1    6/2011 Mitra

FOREIGN PATENT DOCUMENTS

| WO | 02/085008 A1 | 10/2002 |
| WO | 03/024107 A1 | 3/2003 |
| WO | 2004/036912 A1 | 4/2004 |
| WO | 2007/065361 A1 | 6/2007 |

OTHER PUBLICATIONS

EPO, Int'l Search Report in PCT/IB2008/002950, Jun. 24, 2009.
EPO, Written Opinion in PCT/IB2008/002950, Jun. 24, 2009.

(Continued)

*Primary Examiner* — Hunter B Lonsberry
(74) *Attorney, Agent, or Firm* — Potomac Patent Group PLLC (57) ABSTRACT

Extended television (TV) reminders enable a user to add a reminder about a TV program or other content in a communication network, a reminder that can be connected to either an event from the EPG or just a time and date. If the user is logged in on an Internet protocol (IP) TV system, the reminder can be displayed on the user's TV display, and if the user is not logged in, a message can be sent to a user device, e.g., a Short Message Service (SMS), text, or other message. Choices presented to the user when a reminder occurs can include accept, snooze (for a configurable amount of time), and delete, among others. If the reminder is connected to a linear TV program, an option to record the program can also be presented (if allowed by the user's subscription and equipment). Reminders are preferably stored in the network, e.g., as a part of a user's service profile. Storing reminders in the network rather than a local device enables the reminders to be provided to the user anywhere, to any network-connected device.

23 Claims, 4 Drawing Sheets

(56) References Cited

OTHER PUBLICATIONS

Ericsson, Network Resource Gateway, Enabling Converged Value Added Services, ICT-OSA/Parlay Workshop 2006, pp. 1-20, Ericsson AB, Mar. 22, 2006.

Parlay Group Parlay X Working Group, Parlay APIs 4.0 Parlay X Web Services White Paper V1.0, Dec. 16, 2002.

IETF, SIP: Session Initiation Protocol, RFC 3261, Jun. 2002.

3GPP, IP Multimedia Subsystem (IMS); Stage 2 (Release 8), Technical Specification 23.228 V8.4.0, Mar. 2008.

3GPP, IP Multimedia Call Control Protocol Based on Session Initiation Protocol (SIP) and Session Description Protocol (SDP); Stage 3 (Release 7), Technical Specification 24.229 V7.11.0, Mar. 2008.

Open IPTV Forum, Functional IPTV Architecture V1.1, Jan. 15, 2008.

R. Noldus et al., Multi-Access for the IMS Network, Ericsson Review No. 2, pp. 81-86, 2008.

U. Olsson et al., Communication Services—The Key to IMS Service Growth, Ericsson Review No. 1, pp. 8-13 (2008).

P. Arberg et al., Network Infrastructure for IPTV, Ericsson Review No. 3, pp. 79-83 (2007).

M. Cedervall et al., Open IPTV Forum—Toward an Open IPTV Standard, Ericsson Review No. 3, pp. 74-78 (2007).

T. Cagenius et al., Evolving the TV Experience: Anytime, Anywhere, Any Device, Ericsson Review, No. 3, pp. 107-111 (2006).

* cited by examiner

FIG. 1

POST /portal-ims-iptv/portal/setReminder.jsp HTTP/1.1\r\n
  Request Method: POST
  Request URI: /portal-ims-iptv/portal/setReminder.jsp
  Request Version: HTTP/1.1
Host: 10.2.10.226:8080\r\n
Content-Type: application/json; charset=UTF-8\r\n
User-Agent: Opera/9.50 (Linux sh4 ; U; en)\r\n
Accept: text/html, application/xml;q=0.9, application/xhtml+xml, image/png, image/jpeg, image/gif, image/x-xbitmap, */*;q=0.1\r\n
Accept-Language: en\r\n
Accept-Charset: iso-8859-1, utf-8, utf-16, *;q=0.1\r\n
Authorization: Digest username="stb910092@iptv.ericsson.se", realm="iptv-portal", uri="/portal-ims-iptv/portal/setReminder.jsp", algorithm=MD5, nonce="1Xps4sVTBAA=da3c50e3cb37c6652082632348e0531d6cbdd04e", cnonc
  Referer: http://10.2.10.226/portal-ims-iptv/index_iap.html?useDefault=false\r\n
  Cookie: device=00:02:61:31:a5:1e; hash=apa; user=Magnus\r\n
  Cookie2: $Version=1\r\n
  Max-Forwards: 10\r\n
  \r\n
Media Type: application/json; charset=UTF-8 (88 bytes)
Content-Length: 88....{'entryId':'e0c37a5e-bfe1-4925-b652-e360138779f2','triggerTime':15,'channelId':'tv4.se'}

Message Header
    From: <sip:BroadcastReminderService@iptv.ericsson.com>;tag=fjjlj717-k6
        SIP from address: sip:BroadcastReminderService@iptv.ericsson.com
        SIP tag: fjjlj717-k6
    Max-Forwards: 69
    Content-Length: 611
    Cseq: 1 MESSAGE
    Route: <sip:130.100.86.44:5060;lr;transport=udp>
    To: <sip:stb910093@iptv.ericsson.se>
        SIP to address: sip:stb910093@iptv.ericsson.se
    Content-Type: text/html
    Via: SIP/2.0/UDP 10.2.9.226:22001;branch=z9hG4bK96fa65c9-ae06-4419-81a5-e510059ad97a
    Call-Id: 10.2.9.226_18_6371578170568978842
    Message body
        Line-based text data: text/html
            <!DOCTYPE HTML PUBLIC '-//W3C//DTD HTML 4.0 Transitional//EN'><HTML><HEAD><TITLE>
            Broadcast Reminder</TITLE><META name='application_id' content='broadcastreminder'/>
            <META name='program_id' content='591e7ac9-af44-48d4-9b0c-8a9e109baae3'/>
            <META name='reminder_id' content='109'/>
            </HEAD><BODY>
            Reminder for 24 Vision on channel SVT24-en-US starting at 2008-08-06 09:15:00<br><A href='http://10.2.10.226:8080/iap-broadcastreminder-war/answer/?id=109&cmd=snooze&lang=en-US'>Snooze</A> <A href='http://10.2.10.226:8080/iap-broadcastremi

FIG. 3

POST /portal-ims-iptv/portal/getAllReminders.jsp HTTP/1.1\r\n
    Request Method: POST
    Request URI: /portal-ims-iptv/portal/getAllReminders.jsp
    Request Version: HTTP/1.1
Host: 10.2.10.226:8080\r\n
Content-Type: application/json; charset=UTF-8\r\n
User-Agent: Opera/9.50 (Linux sh4 ; U; en)\r\n
Accept: text/html, application/xml;q=0.9, application/xhtml+xml, image/png, image/jpeg, image/gif, image/x-xbitmap, */*;q=0.1\r\n
Accept-Language: en\r\n
Accept-Charset: iso-8859-1, utf-8, utf-16, *;q=0.1\r\n
Authorization: Digest username="stb910092@iptv.ericsson.se", realm="iptv-portal", uri="/portal-ims-iptv/portal/getAllReminders.jsp", algorithm=MD5, nonce="1Xps4sVTBAA=da3c50e3cb37c6652082632348e0531d6cbdd04e", cnonc
    Referer: http://10.2.10.226/portal-ims-iptv/index_iap.html?useDefault=false\r\n
    Cookie: device=00:02:61:31:a5:1e; hash=apa; user=Magnus\r\n
    Cookie2: $Version=1\r\n
    Max-Forwards: 10\r\n
\r\n

EXTENDED TELEVISION REMINDERS

TECHNICAL FIELD

This invention relates to electronic communication networks, and more particularly to media content delivery in packet-switched communication networks.

BACKGROUND

As television (TV) moves from one-way distribution toward two-way interactive communication networks and from being watched in one location toward being watched anywhere on all types and sizes of screens, we will witness the birth of an entirely new mass market for TV programming, advertising, interactive games, and other services. Interactivity through wireline and wireless two-way networks will make it possible for viewers to participate in many ways, for example, to vote in TV shows, to buy products by interacting with advertisements, and to send personal messages to TV shows. The viewer will have new possibilities when it comes to personalization, for example, what ads to receive in targeted advertising, how TV programs are listed in an electronic program guide (EPG), which program content to consume and when, etc.

Internet Protocol Television (IPTV) offers new revenue opportunities for wireline telecom service providers when it comes to attracting new customers to their networks in order to offset declining voice traffic revenues. It may be that wireline telecom service providers will be more or less forced to move into IPTV for their long-term survival. With IPTV, telecom service providers can start to compete with TV offerings from cable operators, satellite-TV operators, and other terrestrial service providers. IPTV also helps providers retain existing customers and prevent churn by introducing a bundled offering of Internet, voice, and IPTV services (so-called "triple play").

IPTV uses web-browser technology to enable IPTV Service Providers to provide media services deployed in communication networks, such as wired and wireless telephone networks. Common web browser applications, such as Mozilla's Firefox and Microsoft's Internet Explorer, enable users to view specific Internet pages and other file locations accessible by the browser. Each page is typically identified by a Uniform Resource Identifier (URI) or similar page address.

In general, IPTV is a system for receiving and displaying multimedia streams encoded as series of IP data packets. Work on IPTV is underway in several contexts, including for example the Open IPTV Forum, which is specifying an end-to-end platform for supplying multimedia and IPTV services to user equipments (UEs) over the Internet and managed networks having controlled quality-of-service (QoS) performance. A version 1.1 specification of a functional IPTV architecture is available at www.openiptvforum.org, and the architecture uses the IP Multimedia Subsystem (IMS) that is specified by the Third Generation Partnership Project (3GPP). A UE can access services offered through an IMS in many ways, both wired (e.g., Ethernet, cable modem, digital subscriber line, etc.) and wireless (e.g., 3GPP-specified cellular radio, IEEE 802.11, IEEE 802.16, etc.).

The IMS is specified in 3GPP Technical Specification (TS) 23.228 V8.4.0, IP Multimedia Subsystem (IMS) Stage 2 (Release 8), March 2008, and previous versions of TS 23.228. IMS is described in, for example, R. Noldus et al., "Multi-Access for the IMS Network", *Ericsson Review* No. 2, pp. 81-86 (2008); U. Olsson et al., "Communication Services—The Key to IMS Service Growth", *Ericsson Review* No. 1, pp. 8-13 (2008); and P. Arberg et al., "Network Infrastructure for IPTV", *Ericsson Review* No. 3, pp. 79-83 (2007). Approaches to IMS-based IPTV are described in M. Cedervall et al., "Open IPTV Forum—Toward an Open IPTV Standard", *Ericsson Review* No. 3, pp. 74-78 (2007), and T. Cagenius et al., "Evolving the TV experience: Anytime, Anywhere, Any Device", *Ericsson Review* No. 3, pp. 107-111 (2006).

The IMS in 3GPP networks uses the Session Initiation Protocol (SIP) and the Session Description Protocol (SDP) as its basic signaling mechanisms. SIP is a mechanism defined in Request for Comment (RFC) 3261 by the Internet Engineering Task Force (IETF) for finding endpoints and routing control signals between them and is a set of simple operations, including REGISTER, INVITE, ACK, and BYE. SDP is a protocol for declaring media. In IMS networks, media transport is based on the real-time transport protocol (RTP), among others. 3GPP TS 24.229 V7.11.0, IP Multimedia Call Control Protocol Based on Session Initiation Protocol (SIP) and Session Description Protocol (SDP), Stage 3, Release 7 (March 2008) specifies an IP Multimedia Call Control Protocol based on SIP and SDP. Section 5 of TS 24.229 specifies SIP usage at a UE, and Section 6 of TS 24.229 specifies SDP usage.

For a UE, which for IPTV can be a set-top box (STB) or a TV having integrated STB capabilities, to access an IMS and IPTV services, the UE registers in a serving call session control function (S-CSCF), which is an IMS core node and is in essence a SIP server. The IMS also includes a number of access nodes, including a proxy CSCF (P-CSCF), a media gateway control function (MGCF), and one or more border gateways (BGs), that mediate UE access to the core nodes and through them to media content residing on media servers. The UE may include an IP multimedia subscriber identity module (ISIM), which is an application, or computer program, residing on a universal integrated circuit card (UICC) that enables the UE to register and access the IMS. The ISIM is typically preconfigured with parameters necessary to initiate the UE's registration to the IMS, including a private user identity, one or more public user identities, and a home network domain name.

In the current IPTV system, there is no interactive way to monitor and control the system from a remote location. With the increasing amount of IPTV content distributed to the home, a user may want to be reminded when a specific content is broadcast or when a specific event occurs. If a user is not at home at the time of any reminder about the broadcast, the user will miss the reminder and the event. The possibility to add reminders to events not connected to a TV show is also missing.

SUMMARY

In accordance with aspects of this invention, there is provided a method of employing a reminder corresponding to media information to be displayed to a user of an electronic communication network. The method includes generating a reminder request message that includes an identifier of the user, a unique identifier of the reminder, and at least one of a media information identifier and an event time; sending the reminder request message to a control server in the communication network; and storing in association with the user a list of reminders based on the reminder request message.

In accordance with further aspects of this invention, there is provided a user equipment for an electronic communication network for accessing and rendering media information. The user equipment includes a transceiver configured to exchange electronic signals with one or more entities in the network; an electronic processor programmably configured to handle information carried by the electronic signals according to instructions in a memory; and a device configured to provide user input to the electronic processor. The processor is configured for an Internet Protocol Television (IPTV) function able to generate a reminder for media information to be displayed to a user at least by generating a reminder request message that includes an identifier of the user, a unique identifier of the reminder, and at least one of a media information identifier and an event time; and sending the reminder request to a control server in the communication network.

In accordance with further aspects of this invention, there is provided an Internet Protocol television control server for storing and retrieving on request reminders corresponding to media information to be presented to a user. The control server includes a transceiver configured for exchanging electronic signals with one or more entities of an electronic communication network; an electronic processor programmably configured to handle information carried by the electronic signals; and a memory configured to store retrievable reminders. The processor is configured to store a list of reminders in association with a profile of the user, the list including at least an identifier of the media information, and a unique identifier of the reminder.

BRIEF DESCRIPTION OF THE DRAWINGS

The several features, objects, and advantages of this invention will be understood by reading this description in conjunction with the drawings, in which:

FIG. 3 depicts an example of a reminder message according to the session initiation protocol;

FIG. 4 depicts an example of a message for retrieving stored reminders;

DETAILED DESCRIPTION

The inventors have recognized that the extended TV reminders described in this application enable a user to add a reminder about a TV program or other content in the communication network, a reminder that can be connected to either an event from the EPG or just a time and date. If the user is logged in on the IPTV system, the reminder can be sent as a SIP/IMS message and displayed on the user's TV display, and if the user is not logged in, a message can be sent to the user, e.g., a Short Message Service (SMS), text, or other message. The choices presented to the user when a reminder occurs can include accept (OK), snooze (for a configurable amount of time), and delete, among others. If the reminder is connected to a linear TV program, the option to record the program can also be presented (if allowed by the user's subscription and equipment). Linear TV is generally a program of media information presented according to a predefined schedule. Reminders are preferably stored in the network, e.g., as a part of a user's IMS or IPTV service profile. Storing reminders in the network rather than a local device enables the reminders to be provided to the user anywhere, to any network-connected device.

Figure 1:
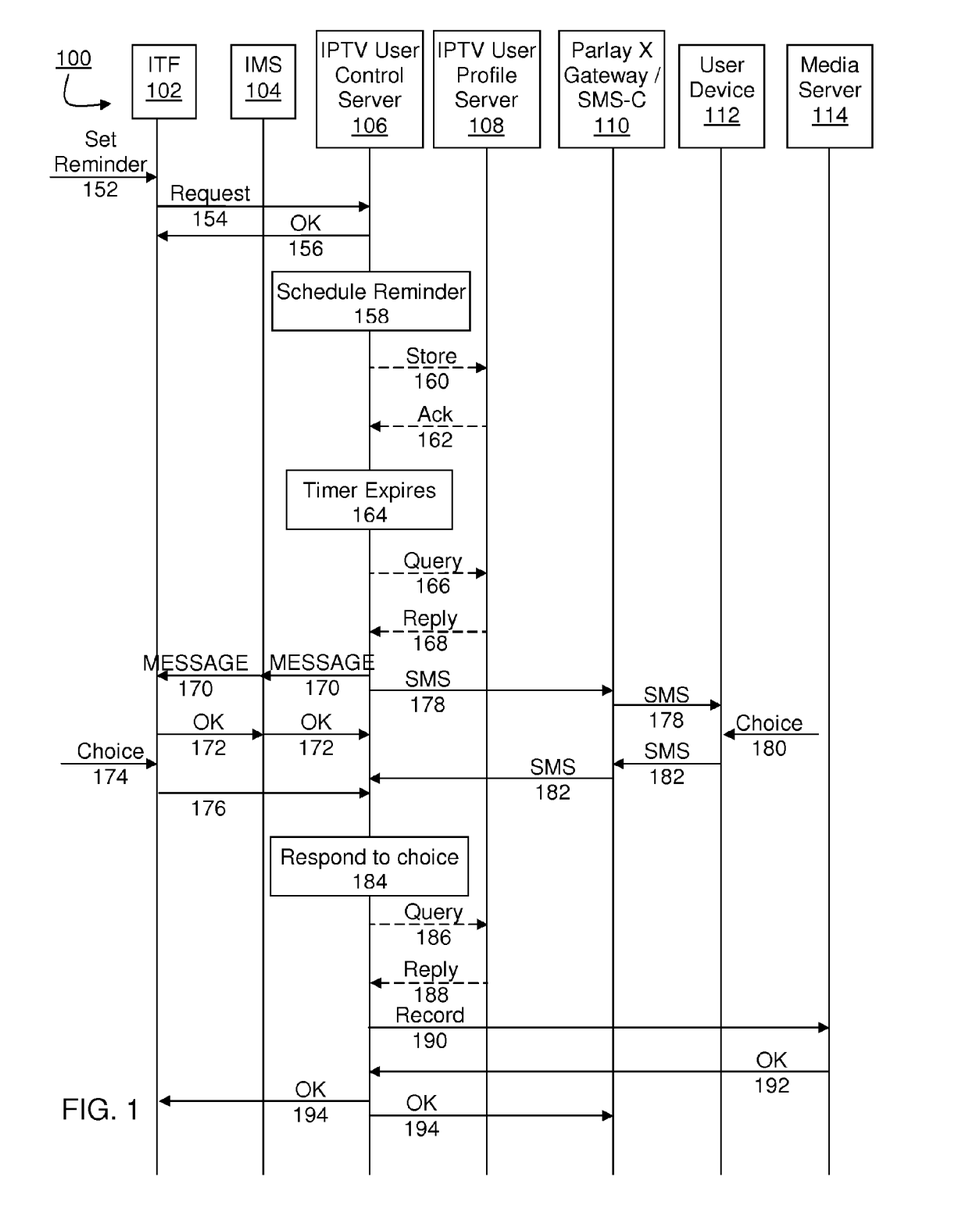
FIG. 1 depicts a communication network and a signal flow among communication network entities in methods of generating and using media reminders.

FIG. 1 depicts a typical signal flow among entities in a communication network 100 in methods of generating reminders and responding to them in accordance with this invention. It will be understood that the methods depicted are in a context of an IMS, employing messages appropriate for an IMS, but in general other contexts and other types of messages can be used.

In step 152, a user sets a reminder, for example by clicking on an entry in the EPG (if the reminder is connected to an EPG event) or by accessing a suitable webpage for reminders in an IPTV Portal through an IPTV terminal function (ITF) 102. The user indicates to the ITF 102 a request to set a reminder by, for example, clicking on the UE's display or a particular button or other control device associated with reminders on the UE, remote control, etc.

In step 154, the user's ITF 102, which is conventionally logged in to an IMS 104, responds to the user's setting a reminder by sending one or more hypertext transfer protocol (HTTP) request messages to an IPTV control server 106. The HTTP request message(s), which need not pass through the IMS control plane, include information elements corresponding to the reminder. As noted above, the HTTP messaging can be conveniently organized as part of the IPTV Portal, which can be an ITF-browser-accessible page presented by the IPTV control server 106. In response to the request message(s), the IPTV control server 106 sends an HTTP OK message as acknowledgement (step 156), and schedules a reminder (step 158), for example by starting a suitable timer that will expire at the desired time indicated in the request message.

Figure 2:
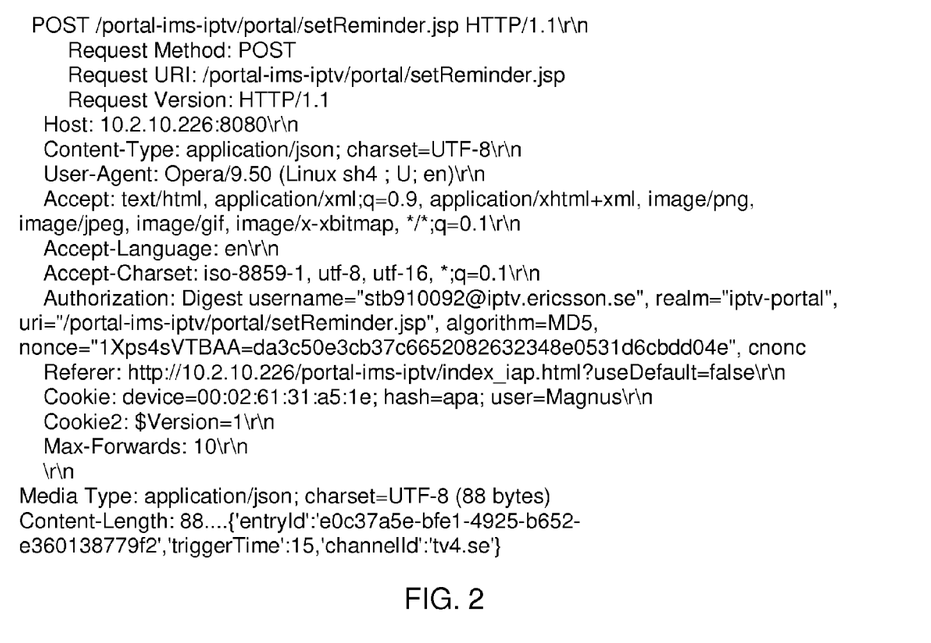
FIG. 2 depicts an example of a reminder request message according to the hypertext transfer protocol.

FIG. 2 shows an example of an HTTP reminder request message that includes at least the following information elements that represent the details of the reminder request. In particular, the depicted reminder request includes a MediaType element that corresponds to the program desired by the user, and a Content-Length element that identifies the reminder request ("'entryifd','e0c37 . . . '"), the time for the reminder ("'triggerTime': . . . ), and the program channel ("'channelid': . . . ). It will be understood that the HTTP request messaging advantageously can request the IPTV control server 106 to load a Java server page (JSP) setReminder.jsp. A JSP is a text-based document capable of returning static (e.g., text, HTML, and other mark-up language) content and dynamic content (e.g., Java code) to a client browser, such as the web browser in the ITF 102.

The ITF 102 is the functionality in the UE, such as a STB, integrated TV/STB, personal computer, mobile telephone, or other user device, that enables IPTV media information to be selected and displayed to a user. As with the other functionalities described in this application, the ITF 102 is typically implemented by a suitably programmed electronic processor or equivalent with memory in the UE that handles information carried by signals exchanged by the UE and other entities in the network 100. The IPTV control server 106 is such a programmed processor implementing functions that determine and control the reminders and media information available to the user. In particular, the IPTV control server executes a suitably written software reminder application, thereby carrying out methods described in this application.

Reminder functionality in the ITF 102 can suggest a display name for the reminder, which may be based on the program's date, time, title, and/or other characteristics. The user can modify the suggested display name of the reminder at the time the reminder is requested or later through a suitably programmed procedure for modifying pending reminders.

It will be understood that the HTTP reminder request message need not be sent only from the ITF 102. In general, a reminder request can be sent from any communication device, such as a smart phone, that includes a browser and is logged in to the IPTV control server 106. The artisan will understand that HTTP request messages are just examples of reminder request messages and that other kinds of messages and other protocols can be used.

The IPTV control server 106 preferably associates the reminder with data in its internal memory that corresponds to the user. Such storage corresponding to the user can also be maintained by another network entity, such as a suitable IPTV user profile server 108, with suitable database querying messages between the control server 106 and user profile server 108. In FIG. 1, the IPTV control server's storing the reminder either internally or in an external device is depicted by storage and acknowledgement steps 160, 162.

When the time set by the reminder occurs (step 164), for example upon expiration of a timer, the IPTV control server 106 advantageously ensures that the media subscription of the user is not blocked and determines who is to be reminded. The IPTV control server 106 also checks whether the user's subscription includes the reminder application (and depending on the type of reminder, the broadcast channel that carries the program corresponding to the reminder). Information pertaining to these operations by the IPTV control server 106, which can include the user's preferred notification channel, can be stored in the server's internal memory or in another network entity, such as the IPTV user profile server 108, with suitable database querying messages between the control server 106 and user profile server 108. As described above in connection with steps 160, 162, the IPTV control server's determining who is to be reminded either internally or in an external device is depicted in FIG. 1 by query and reply steps 166, 168.

If the user's preference is for notification via SIP/IMS, the IPTV control server 106 determines whether the user is logged in to the IMS 104 and if so, the IPTV control server 106 sends a reminder message (step 170), such as a SIP MESSAGE, to the IMS 104, which forwards the reminder message to the user's ITF 102. The ITF 102 responds with a SIP 200 OK message (step 172) that is forwarded by the IMS 104 to the IPTV control server 106. If the user is not logged in to the IMS 104 or if the user's preference is for notification via a different communication channel, the IPTV control server notifies the user via an SMS, text, or other message as described in more detail below.

The reminder message sent in step 170 advantageously can contain or direct the user to an HTML page that includes details of the reminder (e.g., channel identifier, program title, program start time, etc.) and HTML links for the user to click and thereby express a choice (step 174) about the reminder. For example, the links can include three choices: record the program, snooze for a selectable period and be reminded again, and switch channels. A suitable browser in the ITF 102 opens the HTML page, for example, in a pop-up window on the user's display.

FIG. 3 shows an example of a SIP MESSAGE that can be sent as a reminder message from the IPTV control server 106 to the ITF 102. As can be seen in FIG. 3, the message includes a uniform resource identifier (URI) identifying the reminder functionality in the IPTV control server 106 (e.g., "BroadcastReminderService@iptv.ericsson.com". In addition, the SIP MESSAGE includes a URI of the ITF 102 (e.g., "stb910093@iptv.ericsson.se"). With line-based text data in the SIP message body, the desired program is identified by name, channel, and start date and time in the "<BODY> . . . " portion of the SIP MESSAGE, which includes an indication of whether the user has chosen to snooze (or delay) the reminder. It will be appreciated that other URIs and arrangements of information can be used.

As noted above, the reminder message advantageously can include or direct the user to HTML links for the user to click and thereby express a choice (step 174) about the reminder. In response to the user's choice(s), the ITF 102 sends one or more suitable HTTP messages (step 176) to the IPTV control server 106. The messaging in step 176 is advantageously similar to the HTTP messaging in step 154, and so it will again be understood that the ITF 102 can request the IPTV control server 106 to load the JSP setReminder.jsp. Depending on the user's choice(s) in the message(s) in step 176, the IPTV control server either deletes the reminder, for example by setting the timer to zero, or sets the timer so that the reminder recurs after a snooze period has elapsed.

The user's profile can indicate to the IPTV control server 106 that the user is to be reminded through both a message to the user's ITF 102 and an SMS message to another of the user's communication devices, such as a mobile telephone. The IPTV control server 106 causes an SMS message to be sent by sending (step 178) a suitable message to a Parlay X gateway that in turn communicates with an SMS center (SMS-C), both of which are indicated in FIG. 1 by the reference character 110. In a conventional way, the SMS-C 110 stores and forwards the SMS message to a suitable user device 112 when the user device is available. Such an SMS message contains text information concerning the reminder, such as an address of a suitable webpage through which the user can express a choice (step 180) as described above in connection with step 174.

The artisan will understand that the IPTV control server 106 can cause an SMS, text, or other message to be sent to the user device 112 in a number of ways, although use of a Parlay X gateway is currently believed to be advantageous. For example for sending an SMS message, the control server 106 can communicate via IP messages with the Parlay X gateway, which can translate a Web Services method call to one or more short message peer-to-peer protocol (SMPP) messages that the Parlay gateway communicates to the SMS-C. Parlay X is a standardized, open application programming interface (API) for current and next-generation communication networks that enables creation of applications using telecom network capabilities, such as SMS and user interaction. A Service Integration Gateway that is commercially available from Ericsson AB, Stockholm, Sweden, is one example of a Parlay X gateway.

In response to the user's choice (step 180), the user device 112 sends a suitable message (step 182) to the IPTV control server 106, for example an SMS message via the SMS-C and Parlay X gateway 110, and based on that message and the user's choice, the IPTV control server 106 either deletes the reminder, for example by setting the timer to zero, or sets the timer so that the reminder recurs after a snooze period has elapsed, or arranges to record the program (if the reminder is connected to a broadcast event).

In connection with sending an SMS message, the IPTV control server 106 can retrieve the contact number or address of one or more user devices 112 so that the IPTV control server 106 can cause an SMS request message to be sent to the user's desired contact number(s). An example of a suitable SMS request message includes predefined text for the message, e.g., "TV Reminder"; program information, e.g., the title and start time; information on how to reply to the reminder, e.g., information on how to record the program in the network and how to snooze the reminder; and a unique reminder identifier for the respective user that is generated by the IPTV Control Server. An example of such a unique reminder identifier is depicted in FIG. 2 as discussed above. The user device 112 can be configured to include the reminder identifier automatically in the user's reply message (step 182), thereby enabling the IPTV control server 106 to correlate the user's response with the reminder request.

It will be understood that the user's profile stored in the control server 106 or user profile server 108 can include information indicating that reminders are to be sent through either SIP messages to the user's ITF 102 or SMS or other suitable messages to the user device 112 or both. It is currently believed to be preferable for a reminder to be sent by a SIP message first, and if that fails (as indicated for example by failure of the user to express a choice in step 174), then to re-send the reminder by an SMS or other message. Nevertheless, the artisan will understand that an SMS message can be sent before a SIP message, or vice versa, or simultaneously, and such messages can be sent to more than one destination.

Moreover, the reminder message can be sent out at a specified time to the user's ITF 102 if the user is logged in to the IMS 104; otherwise the reminder can be sent out as an SMS message. As described above, the user can respond to a reminder with choices of record-program, switch-channel, snooze, delete, etc. If the user ignores the reminder (e.g., no choice is made and no reply is sent), the reminder can be deleted when the program starts. It will be appreciated that it is also possible to configure the IPTV control server 106 such that the reminder is re-sent one or more times after the program starts if the user has ignored the previous reminder(s).

As described above, a user can choose to record a program in response to a reminder, for example by clicking on a "record" link in a pop-up reminder window presented by an ITF's browser application. In that example, the user's ITF 102 can send an HTTP request (step 176) to the IPTV control server 106 to record the program, for example by invoking the JSP setReminder.jsp. If the user chooses "record" in response to an SMS message sent to the user device 112, the user device 112 sends (step 182) an SMS or other suitable message to the IPTV control server 106 to record the program. The SMS message includes information that indicates the user's desired action and the unique reminder identifier for the user.

The IPTV control server 106 responds (step 184) to a user choice message (step 176 or step 182) by checking whether the reminder is not expired and the user is allowed to record the program. The IPTV control server also advantageously checks whether the program meets the user's allowed rating, which can be part of the stored user profile. For broadcast channels, the IPTV control server 106 typically already has information about program ratings, but if not, it can fetch program data from a media server 114. The IPTV control server 106 also checks whether the user has time remaining on the user's subscription quota and calculates a recording time offset, if any. Such an offset is not always necessary because the IPTV control server 106 can simply order the media server 114 to start recording at the time the broadcast program starts. The IPTV control server 106 can also check whether this is the first recording request for this program. As described above in connection with steps 160, 162, the retrieval of information by the IPTV control server 106 in responding to a user choice either from internal memory or from an external device is depicted in FIG. 1 by query and reply steps 186, 188.

To start a recording, the IPTV control server 106 sends a suitable recording request message (step 190) to the media server 114. After receiving an OK acknowledgement from the media server 114 (step 192), the IPTV control server 106 deletes the reminder and returns an OK status message to the ITF 102 and/or the user device 112 (step 194).

After a reminder is created, a user can retrieve his or her list of reminders simply by accessing his or her IPTV user profile from a suitable access device, such as a STB or other UE, and accessing can be performed from a device other than that on which the reminder was created. When logging in or otherwise signing onto the IPTV system through a browser, the user is typically presented with a menu of selectable links, one of which can be a link to "IPTV reminders". By selecting that link, the user's ITF sends a request to the IPTV user profile server, which has stored the IPTV reminders as described above, to retrieve the stored reminders. For example, the user can set and view his or her reminders in the EPG and/or through a suitable "My Reminders" menu from a browser-based content guide presented through the ITF 102. The user can also delete a reminder from the list of reminders. The content guide is preferably generated by the IPTV control server 106, and scheduled reminders can be indicated in the guide by suitable icons.

FIG. 4 depicts a suitable HTTP message for retrieving a specific user's reminders from the reminders portion of a user's profile either in the IPTV control server 106 or the IPTV user profile server 108. In general, it can be observed from FIG. 4, that the HTTP message requests the IPTV control server 106 to load a suitably configured JSP getALLReminder.jsp. Information needed by the IPTV control server 106 to carry out the request successfully is embedded in the message depicted in FIG. 4, in particular, an identifier (ID) of the ITF 102 ("username=...") and a cookie, which contains the user's UE ID (such as a medium access control (MAC) address "00:02:...") and user ID ("Magnus\r\n"). Retrieved results are displayed to the user, for example, the web browser in the user's ITF 102 parses the retrieved information, and the user can select from the displayed results. The artisan will understand that the user can use the web browser in the ITF 102 to modify or edit one or more reminders selected from a list of reminders and send the changes to the network using suitable messages to modify the stored reminder list.

It will be appreciated that before acting on a request message, the IPTV control server 106 or another network entity would typically invoke suitable access control and user authentication procedures, e.g., requiring the user to enter a username and password. If those procedures are completed successfully and access is granted, the list of reminders is returned in a suitable message, such as HTTP messages that are parsed by the user's browser. It will also be understood that after the information pertaining to a reminder is saved in the user's profile, the user may be notified by a suitable instruction or indication that "your list of reminders has changed".

The artisan will understand that the methods and apparatus described in this application can be implemented in many types of electronic communication networks, such as mobile radio networks.

Figure 5:
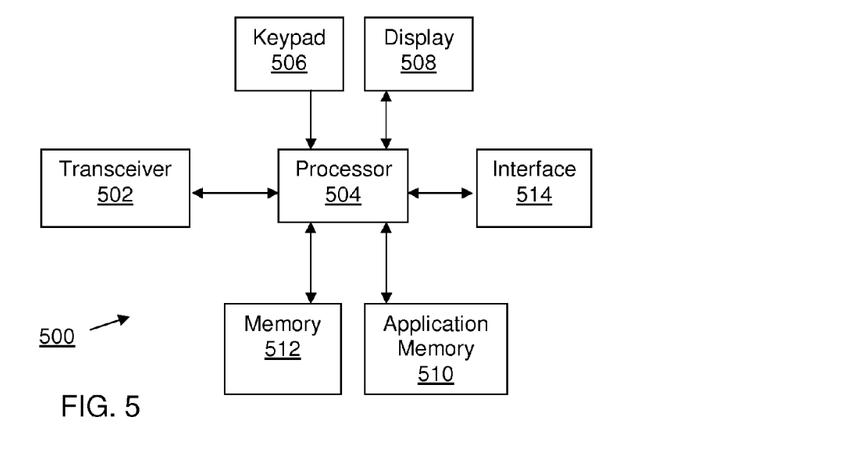
FIG. 5 is a block diagram of a user equipment.

FIG. 5 is a block diagram of a typical UE 500, such as a mobile phone, STB, computer, etc., for accessing and rendering media program content as described in this application. The UE 500 includes a transceiver 502 that is suitable for exchanging electronic signals with one or more of the network entities depicted in FIG. 1. Information carried by those signals is handled by a processor 504, which may include one or more sub-processors, and which executes one or more software modules and applications, including for example the ITF 102, to carry out the operations of the UE 500 described above. User input to the UE 500 is provided through a keypad, remote control, or other device 506, and information presented to the user is provided to a display 508. If the display has touch-screen capabilities, user input can be provided through the display. Software applications may be stored in a suitable application memory 510, and the UE may also download and/or cache desired information in a suitable memory 512. The UE 500 may also include an interface 514 that can be used to connect other components, such as a computer, microphone, etc., to the UE 500.

In creating a reminder, the ITF 102 receives a reminder request via the keypad 506 or the interface 514 that is passed to the processor 504, which has information in the memory 512 of the content or program, such as its own copy of the program schedule in the memory 512, and with that information, the processor 504 forms the appropriate request message (step 154) and sends it to the IPTV control server 106 via transceiver 502. The transceiver 502 receives the SIP MESSAGE (step 170) indicating a user's reminder, and the ITF 102 acknowledges receipt of the SIP MESSAGE by having the processor 504 form a SIP 200 OK message that is sent by the transceiver 502 to the network (step 172). The processor 504 may then present an indication of the reminder or the actual reminder itself to the user via the display 508.

Figure 6:
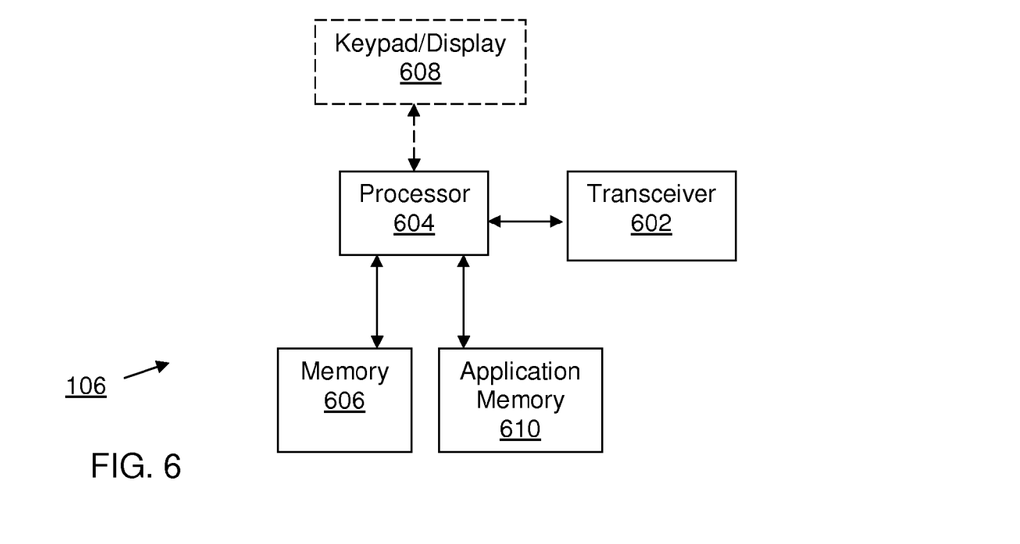
FIG. 6 is a block diagram of an IPTV user profile server.

FIG. 6 is a block diagram of a typical IPTV control server 106 for storing and retrieving reminders on request as described in this application. The IPTV control server 106 includes a transceiver 602 that is suitable for exchanging electronic signals with one or more of the network entities depicted in FIG. 1. Information carried by those signals is handled by a processor 604, which may include one or more sub-processors, and which executes one or more software modules and applications to carry out the operations of the IPTV control server 106 described above. In particular, the processor 604 stores user reminders in a suitable memory 606 and in response to received requests retrieves selected reminders from the memory 606. It will be understood that a typical IPTV control server 106 is a database server in the network 100 and so a keypad/display 608 is usually not needed for user input/output, although such interfaces may be provided for administrative functions. Software applications executed by the processor 604 may be stored in a suitable application memory 610.

Figure 7:
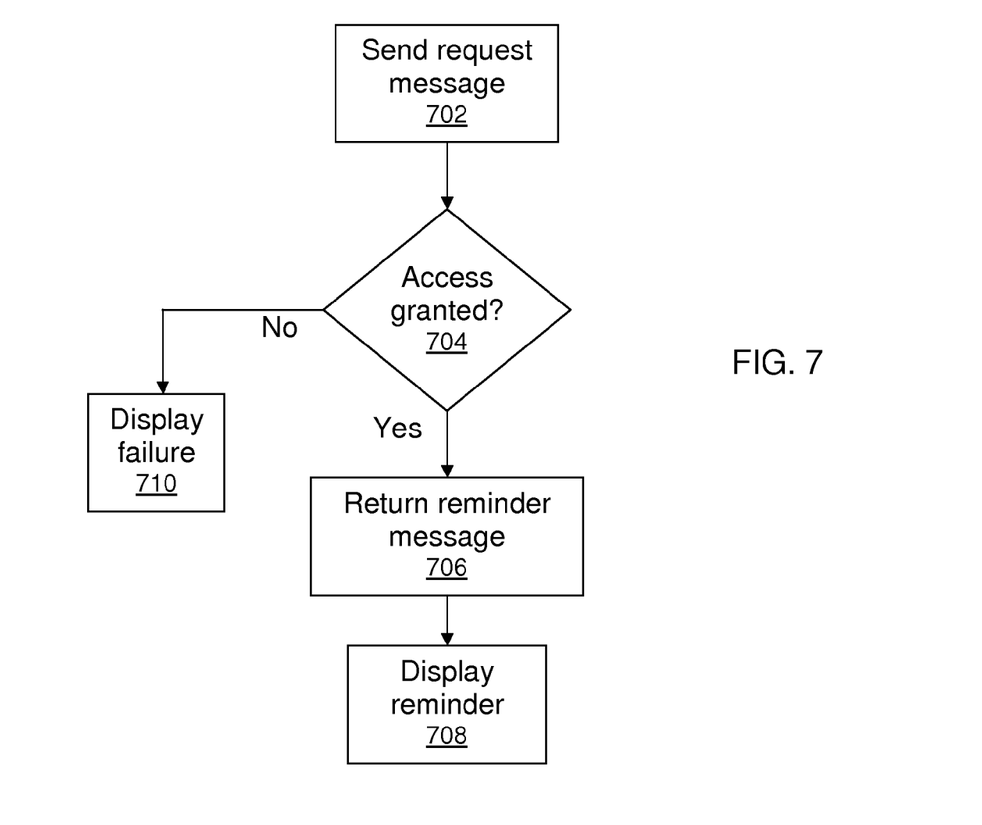
FIG. 7 is a flowchart that depicts a method of retrieving a reminder.

FIG. 7 is a flowchart that depicts a method of retrieving a reminder from the IPTV control server 106. As described above, a user retrieves his or her list of reminders by sending (step 702) a request, such as that depicted in FIG. 4, from the user's UE to the IPTV control server 106. As described above, the IPTV control server 106 advantageously stores all reminders and sends out SIP MESSAGEs only when it is time to remind the users. In such an exemplary arrangement, nothing need be locally stored at an ITF 102, although it will be understood that a suitably configured ITF 102 could prompt a user to send a request to retrieve a reminder, which may include logging in or otherwise signing onto the IPTV system and possibly entering a username and password on the IPTV control server 106 or another network entity. If access is granted (Yes in step 704), the list of reminders is returned (step 706) to the user's UE by the IPTV control server 106 in a suitable message, such as an HTTP message. The returned reminder or list of reminders can be returned to various UEs as described above. At the UE, the returned message is advantageously parsed by a browser or other suitable application implemented by the UE, and the retrieved reminder or reminder list is presented on the UE's display (step 708). If access is not granted (No in step 704), a failure or similar error message is presented on the UE's display.

With this invention, a user can set a reminder (connected or not connected to a scheduled TV program event) and still receive the reminder even if the user is not logged in to the IPTV system.

The invention described here can be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium. More specific examples (a non-exhaustive list) of the computer-readable medium include an electrical connection having one or more wires, a portable computer diskette, a RAM, a ROM, and an erasable programmable read-only memory (EPROM or Flash memory).

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions can be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method of employing a reminder corresponding to media information to be displayed to a user of an electronic communication network, comprising:
   (a) generating a reminder request message, wherein the reminder request message includes an identifier of the user and at least one of a media information identifier and an event time;
   (b) sending the reminder request message to a control server in the communication network;
   (c) generating a unique identifier of the reminder request message in the control server and sending the unique identifier to a user equipment;

(d) storing in association with the user a list of reminders and unique identifiers based on reminder request messages; and
(e) sending a reminder message from the control server to at least one user equipment at a time based on the reminder request message;
wherein sending a reminder message includes either
(1) determining the user's preferred notification channel, sending the reminder message by the preferred notification channel, determining if the user has responded to the reminder message, and if not, sending another reminder message by a different notification channel; or
(2) determining whether the user is logged in to an internet protocol multimedia subsystem in the communication network.

2. The method of claim 1, wherein the media information identifier includes a program channel identifier.

3. The method of claim 1, wherein in response to the reminder request message, the control server loads a reminder page for viewing by a web browser in a user equipment.

4. The method of claim 1, wherein the reminder message includes at least a channel identifier, a program title, and a program start time, and enables the user to express a choice about the reminder.

5. The method of claim 4, wherein the choice includes at least one of record the program, snooze for a selectable period and be reminded again, and switch channels.

6. The method of claim 4, further comprising checking, in response to the choice to record the program, whether the reminder is not expired and the user is allowed to record the program.

7. The method of claim 1, wherein the reminder message is a short message service message.

8. The method of claim 1, wherein the list of reminders is associated with a stored profile of the user.

9. The method of claim 1, further comprising retrieving the list of reminders in response to a retrieval message sent by the user.

10. An Internet Protocol television control server for storing and retrieving on request reminders corresponding to media information to be presented to a user, comprising:
a transceiver configured for exchanging electronic signals with one or more entities of an electronic communication network;
an electronic processor programmably configured to handle information carried by the electronic signals; and
a memory configured to store retrievable reminders;
wherein the processor is configured to generate unique identifiers for reminders, to send unique identifiers to a user equipment, to store a list of reminders in association with a profile of the user, the list including at least an identifier of the media information, and a unique identifier of the reminder; and to cause a reminder message to be sent from the control server to at least one user equipment at a time based on a reminder request message, causing the reminder request to be sent including determining whether the user is logged in to an Internet Protocol multimedia subsystem in the communication network.

11. The control server of claim 10, wherein the processor is configured to load, in response to a reminder request message from the user, a reminder page for viewing by a web browser.

12. The control server of claim 10, wherein the processor is configured to check, in response to a user choice to record a program, whether the reminder is not expired and the user is allowed to record the program.

13. The control server of claim 10, wherein the media information identifier includes a program channel identifier.

14. The control server of claim 10, wherein the reminder message includes at least a channel identifier, a program title, and a program start time, and enables the user to express a choice about the reminder.

15. The control server of claim 10, wherein the reminder message is a short message service message.

16. The control server of claim 10, wherein the list of reminders is associated with a stored profile of the user.

17. An Internet Protocol television control server for storing and retrieving on request reminders corresponding to media information to be presented to a user, comprising:
a transceiver configured for exchanging electronic signals with one or more entities of an electronic communication network;
an electronic processor programmably configured to handle information carried by the electronic signals; and
a memory configured to store retrievable reminders;
wherein the processor is configured to generate unique identifiers for reminders, to send unique identifiers to a user equipment, to store a list of reminders in association with a profile of the user, the list including at least an identifier of the media information, and a unique identifier of the reminder; to cause a reminder message to be sent from the control server to at least one user equipment at a time based on a reminder request message; to determine the user's preferred notification channel for receiving the reminder message; to determine if the user has responded to the reminder message, and if not, to send another reminder message by a different notification channel.

18. The control server of claim 17, wherein the media information identifier includes a program channel identifier.

19. The control server of claim 17, wherein in response to the reminder request message, the control server loads a reminder page for viewing by a web browser in a user equipment.

20. The control server of claim 17, wherein the reminder message includes at least a channel identifier, a program title, and a program start time, and enables the user to express a choice about the reminder.

21. The control server of claim 17, wherein the reminder message is a short message service message.

22. The control server of claim 17, wherein the list of reminders is associated with a stored profile of the user.

23. The control server of claim 17, wherein the processor is further configured to retrieve the list of reminders in response to a retrieval message sent by the user.

* * * * *